United States Patent [19]

Fitzgerald

[11] 4,128,514

[45] Dec. 5, 1978

[54] STABLE POLYCHLOROPRENE LATEX

[75] Inventor: Kenneth D. Fitzgerald, Sugarland, Tex.

[73] Assignee: Denka Chemical Corporation, Houston, Tex.

[21] Appl. No.: 868,192

[22] Filed: Jan. 9, 1978

[51] Int. Cl.² ............................................. C08L 11/02
[52] U.S. Cl. .................................................. 260/17 A
[58] Field of Search ..................................... 260/17 A

[56] References Cited

U.S. PATENT DOCUMENTS

| 3,054,786 | 9/1962 | Burkholder et al. | 526/216 |
| 3,080,333 | 3/1963 | Kray et al. | 260/17 A |
| 3,515,692 | 6/1970 | Carrock et al. | 260/17 A |
| 3,703,568 | 11/1972 | Kadowaki et al. | 260/890 |

FOREIGN PATENT DOCUMENTS 2426012  12/1974  Fed. Rep. of Germany .......... 260/29.7

*Primary Examiner*—M. J. Welsh
*Attorney, Agent, or Firm*—Kenneth H. Johnson

[57] ABSTRACT

An aqueous latex having good colloidal stability against coagulation upon the addition of ionic material is made by polymerizing (1) an aqueous suspension of chloroprene monomer containing about 0.5 to 5.0 parts of alpha, beta-unsaturated carboxylic acid monomer, based on total monomer, in the presence of 2-6 parts by weight of a protective colloid containing 0.1 to 6 parts by weight hydroxyethyl cellulose and from 0 to 2.9 parts by weight of polyvinyl alcohol.

22 Claims, No Drawings

STABLE POLYCHLOROPRENE LATEX

BACKGROUND OF THE INVENTION

This invention relates to stable latexes of chloroprene-alpha, beta-unsaturated carboxylic acid copolymers, prepared by the polymerization of the corresponding monomers in the presence of protective colloids.

The prior art has been mainly directed toward incorporating nonionic surfactants and protective colloids as a postpolymerization addition to a conventional soap stabilized latex, or during polymerization in conjunction with a predominant amount of conventional surfactant.

German Offenlegungsschrift No. 2,426,012 disclosed the preparation of stable polychloroprene latexes by the polymerization of systems substantially free of the soaps of long-chain fatty acids and rosin acids and comprising the chloroprene monomer with polyvinyl alcohol and dialkyl xanthogen disulfide or alkyl mercaptan chain transfer agents and optionally with copolymerizable alpha, beta-unsaturated short chain carboxylic acids. The latexes are disclosed to be useful as adhesives, which may be highly loaded with electrolytes and other materials commonly included in latex formulations and remain stable whereas the fatty acid and rosin soap stabilized latexes would coagulate.

Latexes made in systems without anionic or cationic soaps or surfactants are made to fill a need for a polychloroprene latex which will remain stable over a wide pH range and when large amounts of fillers, electrolytes and other compounding ingredients are added, without a corresponding large amount of surface active agents.

In particular, the latexes of the present invention can be heavily loaded with electrolytes (ionic material) which would immediately coagulate conventional surfactant stabilized emulsions. Such electrolytes include aluminum hydroxide, antimony chloride, zinc oxide, magnesium oxide and the like. Polychloroprene, which is heavily loaded with such materials has high flame retardant properties. The electrolyte loaded latexes may be foamed by known methods, dried and applied over highly combustible polyurethane foams used for cushions, padding, mattresses and the like to provide a foam composition which has vastly improved flame retardant properties.

It is an advantage of this invention that emulsion polymerization of chloroprene and a small amount of lower acid comonomer may be carried out without long chain fatty acid or rosin acid soap emulsifiers. It is a further advantage that shorter polymerization times and better controlled polymerizations are obtained over polyvinyl alcohol as the sole protective colloid. It is a still further advantage of the present invention that smaller amounts of polyvinyl alcohol may be used than possible previously, to achieve a higher degree of latex stability. These and other advantages will become apparent from the following:

SUMMARY OF THE INVENTION

According to the present invention it has been found that novel compositions and process are provided by polymerizing a carboxylic acid soap-free, aqueous suspension of chloroprene monomer containing about 0.5 to 5.0 parts by weight of an alpha, beta-unsaturated carboxylic acid monomer based on the total weight of monomer, in the presence of (a) 2 to 6 parts by weight of a protective colloid containing 0.1 to 6 parts by weight hydroxyalkyl cellulose and from 0 to 2.9 parts by weight of polyvinyl alcohol and (b) 0.5 to 2 parts by weight of an organic sulfur containing chain transfer agent selected from the group consisting of alkyl mercaptans and compounds having the general structure:

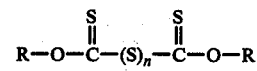

wherein R is a hydrocarbon radical having 1 to 8 carbon atoms and $n$ is 2 to 6, (a) and (b) each being in parts by weight based on 100 parts of monomer. The hydroxyalkyl cellulose preferably has a Brookfield viscosity of less than 40 centipoise in aqueous solution of the polymerization system in the amounts recited hereinabove.

A preferred polymerization contains 2.0 to 5 parts by weight of a protective colloid comprising 0.1 to 5 parts by weight hydroxyalkyl cellulose and 0 to 2.9 parts by weight polyvinyl alcohol.

Furthermore, while it is intended that the present latexes be sterically stabilized as opposed to the ionic stabilization of conventional latexes prepared with soaps or sulfate and sulfonate surfactants, a minor amount, i.e., about 0.1 to 1.0 part by weight based on 100 parts of monomer (originally present), of a sulfate or sulfonate containing surfactant may be desirable for the polymerization of the latex after about 50% of the monomer has been polymerized according to the present invention, but not for the purpose of stabilization. The sulfate or sulfonate surfactants aid in the orientation and transportation of the catalyst initiated species to the existing growing polymer particle, instead of a continual initiation and agglomeration of new particles. The continuous growth of the existing particles is of particular concern to the present sterically stabilized latexes, because in the absence of electrolytes, after about 50% of the monomers have been polymerized, the latex becomes too stable to agglomerate and the viscosity of the latex continues to increase if new particles are formed.

A small amount (a solublizing amount) of sulfate or sulfonate surfactant may be added to the system initially to facilitate dissolving the hydroxyalkyl cellulose and polyvinyl alcohol, i.e., generally about 0.05 to 0.075 parts by weight per 100 parts of monomer. This small amount of surfactant is not seen to have any other particular effect in regard to stability at these low concentrations.

After the polymerization, additional protective colloid may be added to the latexes to further stabilize them.

The term "protective colloid" as used herein means a material which will sterically stabilize latex particles.

DETAILED DESCRIPTION OF THE INVENTION

It has been found that hydroxyalkyl cellulose either alone or combined with polyvinyl alcohol is uniquely advantageous in that the hydroxyalkyl cellulose imparts to the system an ease of polymerization at all conversion levels that is lacking with polyvinyl alcohol alone. The time to 95% monomer conversion according to present invention is only about ½ of the time necessary with polyvinyl alcohol alone.

Generally, lesser amounts of hydroxyalkyl cellulose or blends thereof with polyvinyl alcohol are required to obtain equivalent stability as when polyvinyl alcohol alone is the protective colloid.

Hydroxyalkyl Cellulose

Hydroxyalkyl cellulose esters are conventionally prepared by first uniformly treating cellulose with an alkali metal hydroxide, after which the resulting alkali cellulose is etherified with an alkyl halide, alkylene oxide or two or more such materials. Hydroxyethyl cellulose and hydroxypropyl cellulose are commercially available with the hydroxyethyl cellulose being of primary importance. It finds application as a thickener in latex paints, adhesives, wellbore fluids and the like and has been used as a protective colloid in the emulsion polymerization of vinyl acetate and its copolymers. In the present illustrative examples hydroxyethyl cellulose (HEC) was employed and a more complete description of these materials is found in "The Encyclopedia of Polymer Science and Technology, Interscience Publishers, 1965, Volume 3, page 511 et seq.

The hydroxyalkyl cellulose ethers suitable for the present invention are those which are water soluble. The hydroxyalkyl cellulose ethers with lower etherification have been found to have lower Brookfield viscosities in aqueous solutions. According to the present invention it is the hydroxyalkyl cellulose, particularly the HEC which produces lower viscosity aqueous solutions which are desirable as protective colloids.

According to the present invention, the hydroxyalkyl cellulose should produce a Brookfield viscosity of less than about 40 centipoise at the concentration employed in the aqueous polymerization system. However, sterically stable systems can not be obtained without at least 2 parts by weight per 100 parts of monomer of a protective colloid containing hydroxyalkyl cellulose.

The obtainment of steric stability with only 2 parts of protective colloid per 100 parts of monomer is possible if the protective colloid contains at least 0.1 part by weight and more preferably about 0.5 parts by weight per 100 parts of monomer hydroxyalkyl cellulose. Within the limitations as to the amount of hydroxyalkyl cellulose as set forth above, it is desirable that the Brookfield viscosity produced by the hydroxyalkyl cellulose be less than 25 centipoise and more preferably less than about 10 centipoise.

If polyvinyl alcohol is the only protective colloid as taught in the prior art at least 3 parts per 100 of monomer are required and then only if additional electrolyte stabilizers are present as an adjunct thereto.

According to one embodiment of the present invention a protective colloid absent any polyvinyl alcohol, and containing 2 to 6, preferably 2.0 to 5, parts of hydroxyalkyl cellulose, preferably HEC, per 100 parts by weight of monomer, said hydroxyalkyl cellulose preferably having a Brookfield viscosity of less than about 40 centipoise in solution in the water of the polymerization system, is disclosed. It should be noted that according to the present invention the viscosity produced by the hydroxyalkyl cellulose in aqueous solution should be as low as possible however, a Brookfield viscosity of about 2.9 centipoise may be the desirable lower limit. Commercial material has been available with viscosities as low as 7 centipoise in 5% aqueous solutions.

Although it is preferable that the hydroxyalkyl cellulose have a Brookfield viscosity in aqueous solution at the concentration employed as a protective colloid of less than 40 centipoise, it should be appreciated that the steric stability which is the focal point and purpose of this invention is achieved when the hydroxyalkyl cellulose produces much higher viscosities. However, the preferred invention is setforth in regard to existing commercial chloroprene polymerization equipment, which would not be able to handle the resultant very high peak viscosity of the latexes produced, when the hydroxyalkyl cellulose produced aqueous viscosities much greater than 40 centipoise. The use of higher torque equipment would overcome that limitation.

Polyvinyl Alcohol

The polyvinyl alcohols are commercially available materials. For a discussion of polyvinyl alcohols, see Encyclopedia of Polymer Science and Technology, Interscience Publishers, 1971, Volume 14, page 149 et seq.

In general, those polyvinyl alcohols (PVA) having a mole percent hydrolysis of 70–100% and a degree of polymerization of 350–2500 may be used. The preferred PVA has a degree of polymerization of 500–600 and a mole percent hydrolysis of 85–89%.

In one embodiment of the present invention, a portion of the hydroxyalkyl cellulose is replaced by PVA, i.e., up to 2.9 parts by weight per 100 parts of monomer. This allows the use of small amounts of higher viscosity grades of hydroxyalkyl cellulose to obtain the requisite low viscosity as described above, but to obtain the superior process and stable latex as obtainable from hydroxyalkyl cellulose alone. The improvement obtained with even small amounts hydroxyalkyl cellulose is surprising.

However, since HEC cost approximately 50% more than polyvinyl alcohol, an economical and effective system is about 0.50 parts of HEC and about 2.5 parts of polyvinyl alcohol.

Surfactants

The soaps of long-chain acids and rosin acids are not compatible with the present system. The systems according to the present invention preferably contain from about 0.2 to 1.0 parts by weight, based on monomer of acid stable anionic sulfate or sulfonate surface active agent for viscosity control in the latter stages of polymerization as noted above.

Typical of these surface active agents containing sulfate or sulfonate groups are the salts of sulfated fatty alcohols, containing 8–18 carbon atoms, alkylbenzenesulfonic acid containing 8–18 carbon atoms in the alkyl chains, or sulfated condensates of phenol, $C_{8-18}$ alkylphenol, or $C_{8-18}$ fatty alcohols with ethylene oxide. The cations of the salts are usually sodium, potassium, or ammonium ions. However, the water soluble salts of the formaldehyde condensates of alkyl-naphthalenesulfonic acids, which are normally excellent stabilizers in chloroprene emulsion polymerization, have not been found to be very effective in the present invention.

Copolymerizable Monomer

The aqueous suspensions of chloroprene to be polymerized according to present invention, contain 0.4 to 5.0 parts per hundred based on total monomer of alpha, beta-unsaturated carboxylic acid.

Examples of suitable compounds are acrylic acid, methacrylic acid, 2-ethylacrylic acid, 2-propylacrylic acid and 2-butylacrylic acid. A preferred acid is methacrylic acid (MAA) because of its reactivity and availability. The desired acid comonomer may be represented by the following structure:

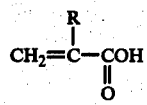

wherein R is hydrogen, an alkyl radical containing one to four carbon atoms or a carboxymethyl radical.

Chain Transfer Agent

The presence of a chain transfer agent is essential in the polymerization to control the molecular weight of the polychloroprene and to assist in the control of the viscosity. The chain transfer agent may be employed in the range of 0.5 to 2 parts by weight per 100 parts of monomer and more preferably in the range of 0.8 to 1.5 parts by weight.

If the intended use of the latex requires a higher cohesive strength than the recited level of chain transfer agent permits, the acid latex may be aged, prior to neutralization of the system, for appropriate periods of time to develop cross-links as known in the art and easily determined by a few simple runs.

The chain transfer agents are the conventional organic sulfur-containing chain transfer agents selected from the group of alkyl mercaptans, dialkyl xanthogen disulfides and polysulfides. Examples of the alkyl mercaptans which may be used are octyl mercaptans, dodecyl mercaptans, tert-dodecyl mercaptan, tridecyl mercaptan and mixtures of mercaptans derived from coconut oil.

The dialkyl xanthogen disulfide and the polysulfide may be represented by the structure:

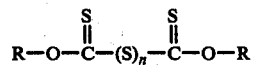

wherein R and n have the significance given above. Preferably n is 2 to 4.

The preferred dialkyl xanthogen disulfides and polysulfides are those wherein R contains 1 to 4 carbon atoms. Diisopropyl xanthogen disulfide (PXD) is a particular preferred chain transfer agent.

The Polymerization

The polymerization is carried out by emulsifying the chloroprene containing the chain transfer agent in a solution which contains the water, protective colloid as defined, acid stable surfactant (if any for solubilizing the protective colloid,) and the alpha, beta-unsaturated carboxylic acid. The total monomer will normally comprise from 40 to 55% of the system. In the present examples, the chloroprene contained 0.1 part of 2,6-di-t-butyl-4-methylphenol (BHT).

The pH of the polymerization suspension should be from about 2 to 4 and may be adjusted with a non-reactive acid such as acetic acid or HCl.

The polymerization is imitated and maintained by adding a free-radical polymerization catalyst, such as peroxide catalyst of the organic or inorganic type and a suitable reducing agent. The highly reactive catalysts systems, such as, hydroperoxides and sodium hydrosulfite are not necessary to initiate and maintain the present polymerization.

The temperature of polymerization may range from 30°–55° C., preferably between 40° and 50° C.

The polymerization is carried to at least 85% monomer conversion with 95% being preferred.

The polymerization is stopped by the addition of an emulsion containing thiodiphenylamine and 4-tert-butylpyrocatechol. Unreacted monomer is removed by steam stripping as disclosed in U.S. Pat. No. 2,467,769. The latex can be neutralized or made basic before or after stripping out the unreacted monomer by addition of diethanolamine but other bases such as triethanolamine, sodium hydroxide, potassium hydroxide or ammonium hydroxide may be used. The following examples are intended to illustrate the invention and not to limit the scope thereof:

EXAMPLES

In the following examples, the chloroprene will always be 98 parts and it will contain 0.1 part of BHT. The other components will be as listed, based on 100 parts of total monomer (chloroprene plus methacrylic acid). The components are shown in the TABLE.

TABLE

| Example | 1 | 2 | 3 | 4 | 5 | 6 | 7 | 8 |
|---|---|---|---|---|---|---|---|---|
| Component | | | | | | | | |
| diisopropyl xanthogen disulfide | 1.00 | 1.00 | .80 | .80 | .80 | 1.00 | .80 | .80 |
| $H_2O$ | 95.00 | 95.00 | 95.00 | 105.00 | 95.00 | 95.00 | 100.00 | 100.00 |
| Methacrylic Acid | 2.00 | 2.00 | 2.00 | 2.00 | 2.00 | 2.00 | 2.00 | 2.00 |
| Hydroxyethyl cellulose | 4.00[1] | | | | .40[2] | .50[2] | | 2.00[2] |
| Polyvinyl alcohol[3] | | 4.00 | 4.00 | 4.00 | 4.00 | 2.50 | 3.00 | — |
| Surfactant[4] | | | .10 | .50 | .05 | .05 | .05 | — |
| Surfactant (2nd addition) | | | .40 | | | .45 | | .25 |
| % Conversion | 95 | 91 | 92 | 94 | 92 | 95 | 90 | 90.5 |
| In minutes | 170 | 470 | 400 | 375 | 340 | 290 | 405 | 210.0 |

[1] Sold by Union Carbide, Cellosize Hydroxyethyl Cellulose type WP, Viscosity Grade 02, Brookfield Viscosity at 25° C, 7–14 cps.
[2] Sold by Hercules Incorporated "NATROSOL" Hydroxyethyl Cellulose, type LR, grade 180 Brookfield Viscosity at 25° C, 75 to 100 cps.
[3] Sold by Monsanto Company, Gelvatol 20–30, degree of polymerization 500 to 600, mole % hydrolysis 85,5 to 98.7
[4] Added to aid solution of the protective colloid.

The HEC used in Example 1 had a 5% solution viscosity of about 10 cps. In all other examles, the HEC had a 5% solution viscosity of about 90 cps. The viscosity-concentration relationship of HEC is a straight line function, hence the viscosities of the HEC-aqueous solution may be easily calculated.

The second surfactant additions were made at about 60% monomer conversion based on oven dried solids.

All samples were found to be stable when tested with 20 ml of 5% alum and 40 grams of dry aluminum hydroxide per hundred grams of latex.

The polymerization temperature for all examples was 45° C. however, most examples would exceed this by 3° to 5° for a few minutes after initiation.

Examples 1, 6 and 8 are according to the invention. Examples 2, 3, 4, 5 and 7 are presented for comparison.

EXAMPLE 1

This latex was polymerized with t-butylhydroperoxide and sodium formaldehyde sulfoxylate and the polymerization rate remained at 15% conversion per hour or better to 95% conversion.

EXAMPLE 2

The catalyst system was the same as in Example 1, but after about 50% monomer conversion the polymerization rate would slow down to 8% or less per hour, and some runs would self terminate prematurely. Also the Brookfield viscosity became progressively higher as the % conversion increased.

EXAMPLE 3

The catalyst system was the same as in Example 1. The surfactant was sodium lauryl sulfate which did improve the polymerization rate somewhat, but the important observation was the Brookfield viscosity, which after stripping out the 5% unpolymerized monomer, was 61 cps.

EXAMPLE 4

The catalyst system was potassium persulfate with sodium formaldehyde sulfoxylate, and the surfactant was the ammonium salt of a sulfated linear primary alcohol ethoxylate. The latex was slow to agglomerate during polymerization resulting in excessive viscosity, but once it did agglomerate the viscosity remained at 125.0 cps at 45° C. to 94% monomer conversion.

EXAMPLE 5

The catalyst system and the surfactant were the same as example 4, but with HEC added, a higher rate of polymerization was obtained, and the surfactant was reduced to facilitate agglomeration during the early stages of polymerization. The latex agglomerated six times during the polymerization run with an increasingly higher minimum viscosity after each agglomerating viscosity.

EXAMPLE 6

This is a preferred system as it contains a good balance between cost, polymerization rate, polymerization viscosity, and final latex viscosity.

The catalyst system and the surfactant are the same as example 4.

EXAMPLE 7

This example of the prior art shows the use of 3 phm PVA. This run was stable enough to achieve polymerization with acceptable viscosities throughout. It was also stable to the addition of alum and aluminum hydroxide prior to steam stripping, however it was not stable enough to be steam stripped of unreacted monomer. The polymerization was slow and the last peak viscosity was high and close to unacceptable for the equipment.

EXAMPLE 8

By comparison with Example 7, this run, according to the present invention shows the use of 2.0 phm of hydroxyethyl cellulose which produced latex, stable to alum and aluminum hydroxide addition and steam stripping of unreacted monomer.

The invention claimed is:

1. A process for preparing latex compositions comprising polymerizing a carboxylic acid soap-free aqueous suspension of chloroprene monomer containing about 0.5 to 5.0 parts by weight of an alpha, beta unsaturated carboxylic acid monomer based on the total weight of monomer, in the presence of (a) 2 to 6 parts by weight of a protective colloid containing 0.1 to 6 parts by weight hydroxyalkyl cellulose and from 0 to 2.9 parts by weight of polyvinyl alcohol and (b) 0.5 to 2 parts by weight of an organic sulfur containing chain transfer agent selected from the group consisting of alkyl mercaptans and compounds having the general structure:

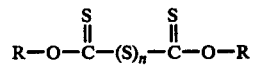

wherein R is a hydrocarbon radical having 1 to 8 carbon atoms and $n$ is 2 to 6, (a) and (b) being in parts by weight based on 100 parts of monomer.

2. The process according to claim 1 containing 2.0 to 5 parts by weight protective colloid comprising 0.1 to 5 parts by weight hydroxyalkyl cellulose and 0 to 2.9 parts by weight polyvinyl alcohol.

3. The process according to claim 1 wherein said hydroxyalkyl cellulose has a Brookfield viscosity of less than 40 centipoise in solution in the water present in said polymerization.

4. The process according to claim 3 wherein said hydroxyalkyl cellulose has a Brookfield viscosity of less than 25 centipoise in solution in said water.

5. The process according to claim 4 wherein said hydroxyalkyl cellulose has a Brookfield viscosity of less than 10 centipoise in solution in said water.

6. The process according to claim 1 wherein a protective colloid solublizing amount of a sulfate or sulfonate containing surfactant is initially present in said polymerization.

7. The process according to claim 1 wherein after about 50% of the monomers have been polymerized, from about 0.1 to 1.0 part by weight based on monomer originally present of a sulfate or sulfonate containing surfactant is added.

8. The process according to claim 1 wherein said hydroxyalkyl cellulose is hydroxyethyl cellulse.

9. The process according to claim 1 wherein said hydroxyalkyl cellulose is hydroxypropyl cellulose.

10. The process according to claim 1 wherein the amount of polyvinyl alcohol present is 0.

11. The process according to claim 1 wherein said polyvinyl alcohol has a present hydrolysis of 70 to 100% and a degree of polymerization of 350 to 2500.

12. The process according to claim 11 wherein said polyvinyl alcohol has a percent hydrolysis of 85 to 89% and a degree of polymerization of 500 to 600.

13. The process according to claim 1 wherein said alpha, beta-unsaturated carboxylic acid has the structural formula:

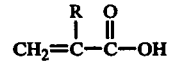

wherein R is hydrogen, an alkyl radical containing one to four carbon atoms or a carboxymethyl radical.

14. The process according to claim 13 wherein the alpha, beta-unsaturated carboxylic acid is selected from the group consisting of acrylic acid, methacrylic acid, 2-ethylacrylic acid, 2-propylacrylic acid, and 2-butylacrylic.

15. The process according to claim 14 wherein said acid is methacrylic acid.

16. The process according to claim 1 wherein said chain transfer agent is alkyl mercaptan.

17. The process according to claim 1 wherein said chain transfer agent is a compound of the formula:

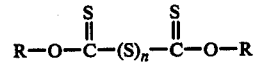

18. The process according to claim 17 wherein said compound is dialkyl xanthogen disulfide.

19. The process according to claim 18 wherein said compound is dissopropyl xanthogen disulfide.

20. The process according to claim 1 wherein the pH is from about 2 to 4.

21. The process according to claim 1 comprising the step of steam stripping of unreacted monomer from said latex after completion of said polymerization.

22. A chloroprene-alpha, beta-unsaturated carboxylic acid copolymer latex having superior stability to electrolytes prepared by the process of claim 21.

UNITED STATES PATENT AND TRADEMARK OFFICE
CERTIFICATE OF CORRECTION

PATENT NO. : 4,128,514
DATED : December 5, 1978
INVENTOR(S) : Kenneth D. Fitzgerald It is certified that error appears in the above—identified patent and that said Letters Patent is hereby corrected as shown below:

Column 1, line 6, reads "prenealpha," but should read -- prene/alpha, --

Column 8, line 52 reads "present" but should read -- percent --

Column 9, line 3 reads "and 2-butylacrylic" but should read -- and 2-butylacrylic acid --

Signed and Sealed this

Twenty-fourth Day of February 1981

[SEAL]

Attest:

RENE D. TEGTMEYER

Attesting Officer    Acting Commissioner of Patents and Trademarks